United States Patent
Tang

(10) Patent No.: US 11,310,794 B2
(45) Date of Patent: Apr. 19, 2022

(54) DATA TRANSMISSION METHOD IN INTERNET OF VEHICLES AND TERMINAL

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 144 days.

(21) Appl. No.: 16/864,647

(22) Filed: May 1, 2020

(65) Prior Publication Data
US 2020/0260446 A1 Aug. 13, 2020

Related U.S. Application Data

(63) Continuation of application No. PCT/CN2017/109061, filed on Nov. 2, 2017.

(51) Int. Cl.
*H04W 72/04* (2009.01)
*H04W 4/46* (2018.01)
*H04W 72/02* (2009.01)

(52) U.S. Cl.
CPC ......... *H04W 72/0446* (2013.01); *H04W 4/46* (2018.02); *H04W 72/02* (2013.01); *H04W 72/042* (2013.01); *H04W 72/0453* (2013.01); *H04W 72/0473* (2013.01)

(58) Field of Classification Search
CPC ............... H04W 72/02; H04W 72/042; H04W 72/0446; H04W 72/0453; H04W 72/0473; H04W 72/46
See application file for complete search history.

(56) References Cited

U.S. PATENT DOCUMENTS

| 10,051,517 | B2* | 8/2018 | Thangarasa | H04W 8/005 |
| 10,425,916 | B2* | 9/2019 | Lee | H04W 72/005 |
| 10,772,075 | B2* | 9/2020 | Lee | H04W 72/02 |
| 10,813,062 | B2* | 10/2020 | Shilov | H04W 56/002 |

(Continued)

FOREIGN PATENT DOCUMENTS

| AU | 2017437917 A1 * | 6/2020 | ............ H04W 72/02 |
| CN | 104955017 A | 9/2015 | |

(Continued)

OTHER PUBLICATIONS

OPPO, Resource Selection in CA-based eV2X, Aug. 21, 2017, Berlin, Germany, Tdoc: R2-1707701 (Year: 2017).*

(Continued)

*Primary Examiner* — Eric Nowlin
(74) *Attorney, Agent, or Firm* — Morgan, Lewis & Bockius LLP

(57) ABSTRACT

The disclosure provides a data transmission method and a terminal in an Internet of Vehicles (IoV) system. In the embodiment of the present disclosure, the terminal may implement the data transmission method in the IoV system by determining a data transmission mode of a first carrier, then obtaining the multi-carrier transmission parameter of the first carrier if the data transmission mode of the first carrier is a multi-carrier transmission mode, and transmitting data on the first carrier using the multi-carrier transmission parameter.

18 Claims, 1 Drawing Sheet

(56) References Cited

U.S. PATENT DOCUMENTS

| | | | |
|---|---|---|---|
| 10,939,463 B2 * | 3/2021 | Wu | H04W 76/15 |
| 11,006,269 B2 * | 5/2021 | Baghel | H04W 76/16 |
| 11,006,317 B2 * | 5/2021 | Hua | H04W 72/0453 |
| 11,012,194 B2 * | 5/2021 | Zhang | H04L 5/0044 |
| 11,109,334 B2 * | 8/2021 | Khoryaev | H04B 17/382 |
| 11,109,355 B2 * | 8/2021 | Zhou | H04W 72/02 |
| 11,153,888 B2 * | 10/2021 | Chae | H04W 72/02 |
| 11,240,783 B2 * | 2/2022 | Lee | H04W 72/10 |
| 2012/0113866 A1 * | 5/2012 | Tenny | H04W 24/10 370/254 |
| 2014/0086081 A1 * | 3/2014 | Mack | H04L 5/006 370/252 |
| 2014/0247802 A1 * | 9/2014 | Wijting | H04W 72/0453 370/329 |
| 2016/0262155 A1 * | 9/2016 | Lindoff | H04W 76/14 |
| 2018/0332564 A1 * | 11/2018 | Lee | H04W 72/048 |
| 2018/0332576 A1 * | 11/2018 | Oh | H04W 16/14 |
| 2018/0338300 A1 * | 11/2018 | Lee | H04L 67/12 |
| 2019/0082352 A1 * | 3/2019 | Hua | H04W 76/15 |
| 2019/0141647 A1 * | 5/2019 | Nimbalker | H04L 5/001 |
| 2019/0215685 A1 * | 7/2019 | Wang | H04W 8/22 |
| 2019/0239178 A1 * | 8/2019 | Shilov | H04W 56/002 |
| 2019/0246377 A1 * | 8/2019 | Zhou | H04W 72/02 |
| 2019/0253919 A1 * | 8/2019 | Wu | H04W 28/0273 |
| 2019/0253927 A1 * | 8/2019 | Mok | H04W 28/0226 |
| 2019/0254062 A1 * | 8/2019 | Wu | H04W 76/15 |
| 2019/0313376 A1 * | 10/2019 | Zhou | H04W 72/0453 |
| 2019/0319840 A1 * | 10/2019 | Cheng | H04L 67/12 |
| 2020/0053675 A1 * | 2/2020 | Khoryaev | H04L 5/0051 |
| 2020/0107330 A1 * | 4/2020 | Chae | H04W 72/085 |
| 2020/0170059 A1 * | 5/2020 | Belleschi | H04W 16/14 |
| 2020/0229194 A1 * | 7/2020 | Belleschi | H04W 72/0453 |
| 2020/0260446 A1 * | 8/2020 | Tang | H04W 72/0446 |
| 2020/0296690 A1 * | 9/2020 | Lee | H04W 72/02 |
| 2020/0351828 A1 * | 11/2020 | Lee | H04W 72/005 |
| 2020/0403731 A1 * | 12/2020 | Zhang | H04L 5/0044 |
| 2021/0014812 A1 * | 1/2021 | Shilov | H04W 56/0005 |
| 2021/0014913 A1 * | 1/2021 | Zhang | H04W 76/14 |
| 2021/0219299 A1 * | 7/2021 | Peng | H04W 76/15 |

FOREIGN PATENT DOCUMENTS

| | | | | |
|---|---|---|---|---|
| CN | 106376082 A | | 2/2017 | |
| CN | 107027105 A | | 8/2017 | |
| CN | 107124770 A | | 9/2017 | |
| CN | 109618566 A | * | 4/2019 | H04W 28/10 |
| CN | 110166201 A | * | 8/2019 | H04W 76/14 |
| CN | 110710289 A | * | 1/2020 | H04W 72/0446 |
| CN | 109618566 B | * | 4/2020 | H04W 28/10 |
| CN | 111316718 A | * | 6/2020 | H04W 56/0005 |
| CN | 111602448 A | * | 8/2020 | |
| CN | 111727622 A | * | 9/2020 | H04W 76/14 |
| CN | 111770473 A | * | 10/2020 | |
| CN | 111800219 A | * | 10/2020 | |
| CN | 110166201 B | * | 1/2021 | H04W 76/14 |
| EP | 3328141 A1 | * | 5/2018 | H04W 76/23 |
| EP | 3328141 A1 | | 5/2018 | |
| EP | 3328141 A4 | * | 2/2019 | H04W 76/23 |
| EP | 3606204 A1 | * | 2/2020 | H04W 72/085 |
| EP | 3606204 A4 | * | 12/2020 | H04W 64/00 |
| EP | 3753285 A1 | * | 12/2020 | H04W 72/1284 |
| EP | 3755091 A1 | * | 12/2020 | H04W 76/11 |
| EP | 3328141 B1 | * | 2/2021 | H04W 76/23 |
| EP | 3328141 B1 | | 2/2021 | |
| EP | E P-3755091 A4 | * | 4/2021 | H04W 72/0453 |
| KR | 20190119122 A | * | 10/2019 | H04W 72/085 |
| KR | 102268756 B1 | * | 6/2021 | H04W 72/02 |
| WO | WO2015142066 A1 | | 9/2015 | |
| WO | WO-2017168391 A1 | * | 10/2017 | H04W 16/14 |
| WO | WO-2018174671 A1 | * | 9/2018 | H04W 72/02 |
| WO | WO-2019024121 A1 | * | 2/2019 | H04W 28/10 |
| WO | WO-2019036863 A1 | * | 2/2019 | H04L 5/001 |
| WO | WO-2019084860 A1 | * | 5/2019 | H04W 72/0446 |
| WO | WO-2019090605 A1 | * | 5/2019 | H04L 5/001 |
| WO | WO-2019157956 A1 | * | 8/2019 | H04W 76/11 |
| WO | WO-2019160774 A1 | * | 8/2019 | H04W 72/14 |
| WO | WO-2020033526 A1 | * | 2/2020 | H04L 5/0044 |
| WO | WO-2021013236 A1 | * | 1/2021 | |
| WO | WO-2021175507 A1 | * | 1/2021 | H04W 40/00 |
| WO | WO-2021018096 A1 | * | 2/2021 | |
| WO | WO-2021158010 A1 | * | 8/2021 | |

OTHER PUBLICATIONS

Huawei et al., Discussion on carrier aggregation for eV2X, Aug. 21, 2017, Berlin, Germany, Tdoc: R2-1707970 (Year: 2017).*
OPPO, Discussion on Service and Carrier Mapping for PC5 CA in eV2X, Aug. 22, 2017, Berlin, Germany, Tdoc: R2-1708039 (Year: 2017).*
OPPO, Discussion on Carrier Configuration and Selection for PC5 CA in eV2X, Aug. 22, 2017, Berlin, Germany, Tdoc: R2-1708040 (Year: 2017).*
CATT, Carrier Configuration and Carrier Selection in eV2X CA, Aug. 22, 2017, Berlin, Germany, Tdoc: R2-1708052 (Year: 2017).*
ZTE, Discussion on PC5 Carrier Aggregation, Aug. 21, 2017, Berlin, Germany, Tdoc: R2-1708509 (Year: 2017).*
Samsung, Discussion on packet duplication in eV2X, Aug. 21, 2017, Berlin, Germany, Tdoc: R2-1709006 (Year: 2017).*
OPPO, Discussion on Carrier Set Configuration for PC5 CA in Mode-3, Oct. 9, 2017, 3GPP TSG-RAN WG2#99bis, Prague, Czech Republic, Tdoc: R2-1710171 (Year: 2017).*
Huawei et al., Discussion on the Tx carrier selection for PC5 CA, Oct. 9, 2017, 3GPP TSG-RAN WG2#99bis, Prague, Czech Republic, Tdoc: R2-1710085 (Year: 2017).*
OPPO, Resource selection in CA-based eV2x, Oct. 9, 2017, 3GPP TSG-RAN WG2#99bis, Prague, Czech Republic, Tdoc: R2-1710145 (Year: 2017).*
OPPO, Carrier selection in CA-based eV2x, Oct. 9, 2017, 3GPP TSG-RAN WG2#99bis, Prague, Czech Republic, Tdoc: R2-1710146 (Year: 2017).*
Intel Corporation, Carrier Selection for CA over PC5, Oct. 9, 2017, 3GPP TSG-RAN WG2#99bis, Prague, Czech Republic, Tdoc: R2-1710651 (Year: 2017).*
Qualcomm Incorporated, Carrier Aggregation for V2X Phase 2, Oct. 9, 2017, 3GPP TSG-RAN WG2#99bis, Prague, Czech Republic, Tdoc: R2-1710684 (Year: 2017).*
Qualcomm Incorporated et al., Oct. 9, 2017, 3GPP TSG-RAN WG2#99bis, Prague, Czech Republic, Tdoc: R2-1710685 (Year: 2017).*
CATT, Carrier Selection in eV2X, Oct. 9, 2017, 3GPP TSG-RAN WG2#99bis, Prague, Czech Republic, Tdoc: R2-1710714 (Year: 2017).*
ZTE, Discussion on carrier selection in PC5 CA, Oct. 9, 2017, 3GPP TSG-RAN WG2#99bis, Prague, Czech Republic, Tdoc: R2-1711011 (Year: 2017).*
Ericsson, Sidelink Carrier Selection Criteria, Oct. 9, 2017, 3GPP TSG-RAN WG2#99bis, Prague, Czech Republic, Tdoc: R2-1711493 (Year: 2017).*
Samsung, Packet Duplication for the Sidelink Carrier Aggregation, Oct. 9, 2017, 3GPP TSG-RAN WG2#99bis, Prague, Czech Republic, Tdoc: R2-1711812 (Year: 2017).*
3GPP Technical Specification 36.331, 3rd Generation Partnership Project;Technical Specification Group Radio Access Network; Evolved Universal Terrestrial Radio Access (E-UTRA); Radio Resource Control (RRC); Protocol specification (Release 14), Sep. 2017, Version 14.4.0 (Year: 2017).*
Guangdong OPPO Mobile Telecommunications Corp. Ltd., Extended European Search Report, EP17930652.7, dated Oct. 19, 2020, 9 pgs.
International Search Report and Written Opinion, PCT/CN2017/109061, dated May 30, 2018, 8 pgs.
Guangdong OPPO Mobile Telecommunications Corp. Ltd., Communication Pursuant to Article 94(3), EP17930652.7, dated Aug. 27, 2021, 7 pgs.

* cited by examiner

DATA TRANSMISSION METHOD IN INTERNET OF VEHICLES AND TERMINAL

CROSS-REFERENCE TO RELATED APPLICATION

This application is a continuation application of PCT Patent Application No. PCT/CN2017/109061, entitled "DATA TRANSMISSION METHOD IN INTERNET OF VEHICLES AND TERMINAL" filed on Nov. 2, 2017, which is incorporated by reference in its entirety.

TECHNICAL FIELD

The present disclosure relates to the Internet of Vehicles (IoV) technology, and in particular, to a data transmission method and a terminal in the Internet of Vehicles.

BACKGROUND

The Internet of Vehicles (IoV) system adopts the method of direct terminal-to-terminal communication, which has higher spectrum efficiency and lower transmission delay. In the IoV system, two types of terminals are generally considered, one is a Vehicle User Equipment (VUE), and the other is a Pedestrian User Equipment (PUE).

In the Internet of Vehicles system, communication between terminals can be based on various wireless communication systems, such as Long Term Evolution (LTE) system. In wireless communication systems, multi-carrier technology has been used as a method to extend system bandwidth. In multi-carrier mode, multi-carrier can serve one terminal, and each carrier is also called a component carrier.

However, the prior art does not give information on how to perform data transmission in an IoV system.

SUMMARY

Various aspects of the present disclosure provide a data transmission method and a terminal in an Internet of Vehicles (IoV) for data transmission in an IoV system.

An aspect of the present disclosure provides a data transmission method performed by a terminal in an Internet of Vehicles (IoV) system, including:
 determining a data transmission mode of a first carrier;
 obtaining a multi-carrier transmission parameter of the first carrier, if the data transmission mode of the first carrier is a multi-carrier transmission mode;
 performing data transmission on the first carrier by using the multi-carrier transmission parameter.

Another aspect of the present disclosure provides a terminal in an Internet of Vehicles (IoV) system, including:
 a determining unit, configured to determine a data transmission mode of a first carrier;
 an obtaining unit, configured to obtain a multi-carrier transmission parameter of the first carrier, if the data transmission mode of the first carrier is a multi-carrier transmission mode;
 a transmission unit, configured to transmit data on the first carrier by using the multi-carrier transmission parameter.

According to one implementation, the multi-carrier transmission parameter comprises at least one of transmission power, coding and modulation mode, subchannel number limit, and physical resource block (PRB) number limit.

According to one implementation, the determining unit is specifically configured to:

determine whether the first carrier is used to carry one first transmission entity together with at least one second carrier; and
 determine that the data transmission mode of the first carrier is the multi-carrier transmission mode, if the first carrier is used to carry the one first transmission entity together with the at least one second carrier.

According to one implementation, the one first transmission entity is using the at least one second carrier to transmit data.

According to one implementation, the determining unit is specifically configured to:
 determine whether at least one third carrier in a first carrier set to which the first carrier belongs is currently being used; and
 determine that the data transmission mode of the first carrier is the multi-carrier transmission mode, if the at least one third carrier in the first carrier set to which the first carrier belongs is currently being used.

According to one implementation, the multi-carrier transmission mode comprises a data repetition based multi-carrier transmission mode.

According to one implementation, the determining unit is specifically configured to:
 determine whether the first carrier is used to carry repeated data; and
 determine that the data transmission mode of the first carrier is the data repetition based multi-carrier transmission mode, if the first carrier is used to carry the repeated data.

According to one implementation, the repeated data comprises a repeated protocol data unit of PDCP layer.

According to one implementation, the determining unit is specifically configured to:
 determine whether the first carrier is used to carry a second transmission entity that transmits repeated data; and
 determine that the data transmission mode of the first carrier is the data repetition based multi-carrier transmission mode, if the first carrier is used to carry the second transmission entity that transmits the repeated data.

According to one implementation, the repeated data comprises a repeated protocol data unit of PDCP layer.

According to one implementation, the repeated data comprises repeated data of a first PDCP entity; data of the first PDCP entity is being transmitted by a third transmission entity, and the second transmission entity is used to transmit the repeated data of the first PDCP entity.

According to one implementation, the first transmission entity comprises an RLC entity; one RLC entity corresponds to one logical channel.

According to one implementation, the second transmission entity comprises an RLC entity; one RLC entity corresponds to one logical channel.

According to one implementation, the obtaining unit is specifically configured to:
 obtain a carrier state parameter of the first carrier; and
 obtain the multi-carrier transmission parameter according to the carrier state parameter.

According to one implementation, the carrier state parameter comprises at least one of a Channel Busy Ratio (CBR), a Received Signal Strength Indicator (RSSI), a service type, and a priority.

According to one implementation, the obtaining unit is specifically configured to:
 obtain a correspondence relationship between the carrier state parameter and the multi-carrier transmission parameter, so as to obtain the multi-carrier transmission parameter of the first carrier according to the carrier state parameter.

According to one implementation, the obtaining unit is specifically configured to:

obtain the correspondence relationship between the carrier state parameter and the multi-carrier transmission parameter from a network device.

According to one implementation, the obtaining unit is specifically configured to:

obtain the correspondence relationship between the carrier state parameter and the multi-carrier transmission parameter from a user card of the terminal.

According to one implementation, the obtaining unit is specifically configured to:

obtain the correspondence relationship between the carrier state parameter and the multi-carrier transmission parameter from device information of the terminal.

Another aspect of the present disclosure provides a non-transitory computer-readable storage medium having stored thereon computer instructions that, when executed by a processor, implement steps of the method according to any one of the first aspects above.

It can be known from the foregoing technical solution that in the embodiment of the present disclosure, by determining a data transmission mode of a first carrier, and further if the data transmission mode of the first carrier is a multi-carrier transmission mode, a multi-carrier transmission parameter of the first carrier can be obtained, so that it is possible to use the multi-carrier transmission parameter to perform data transmission on the first carrier, thereby implementing data transmission in the IoV system.

BRIEF DESCRIPTION OF THE DRAWINGS

In order to more clearly illustrate the technical solutions in the embodiments of the present disclosure, the drawings used in the embodiments or the description of the prior art will be briefly introduced below. Obviously, the drawings in the following description are of the present disclosure. For some embodiments, for those of ordinary skill in the art, other drawings can be obtained according to these drawings without paying creative labor.

DETAILED DESCRIPTION

In order to make the objectives, technical solutions, and advantages of the embodiments of the present disclosure clearer, the technical solutions in the embodiments of the present disclosure will be clearly and completely described with reference to the accompanying drawings in the embodiments of the present disclosure. Obviously, the described embodiments are a part of the embodiments of the present disclosure, but not all the embodiments. Based on the embodiments of the present disclosure, all other embodiments obtained by a person of ordinary skill in the art without creative efforts shall fall within the protection scope of the present disclosure.

In the Internet of Vehicles system, communication between terminals can be based on various wireless communication systems, such as: Long Term Evolution (LTE) systems. It is a sidelink (SL) transmission technology, which is different from the way in which data is received or sent through network devices in traditional wireless communication systems. The Internet of Vehicles system uses terminal-to-terminal direct communication and therefore, it has high spectral efficiency and lower transmission delay.

In addition, the term "and/or" in this article is only an association relationship describing the associated objects, which means that there can be three kinds of relationships, for example, A and/or B can mean: A exists alone, A and B exist simultaneously, and B exists alone. In addition, the character "/" in this article generally indicates that the related objects are an "or" relationship.

Figure 1:
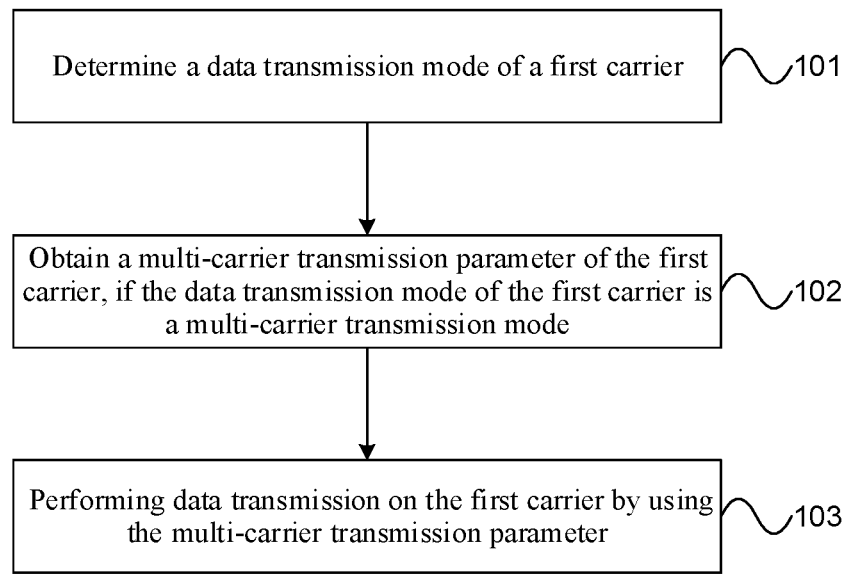
FIG. 1 is a schematic flowchart of a data transmission method in an Internet of Vehicles (IoV) according to an embodiment of the present disclosure.

FIG. 1 is a schematic flowchart of a data transmission method in an Internet of Vehicles (IoV) provided by an embodiment of the present disclosure, as shown in FIG. 1.

In Step 101, a data transmission mode of a first carrier is determined.

In Step 102, a multi-carrier transmission parameter of the first carrier is obtained, if the data transmission mode of the first carrier is a multi-carrier transmission mode;

The so-called multi-carrier transmission parameter may include, but are not limited to, at least one of transmission power limit, coding and modulation mode limit, subchannel number limit, and physical resource block (PRB) number limit, which is not particularly limited in this embodiment.

In Step 103, data transmission is performed on the first carrier by using the multi-carrier transmission parameter.

So far, data transmission in the Internet of Vehicles system has been realized.

It should be noted that execution subject of 101 to 103 may be a terminal.

In the present disclosure, the involved terminal may be an in-vehicle terminal, or may also be a handheld terminal with a listening capability, which is not particularly limited in this embodiment.

It should be noted that the handheld terminal involved in the embodiments of the present disclosure may include, but is not limited to, a mobile phone, a Personal Digital Assistant (PDA), a wireless handheld device, a tablet computer, and a personal computer (PC), an MP3 player, an MP4 player, and wearable devices (for example, smart glasses, smart watches, smart bracelets, etc.) etc. The in-vehicle terminal involved in the embodiment of the present disclosure may also be referred to as a vehicle-mounted machine, which refers to a short name of a vehicle-mounted infotainment product installed in the vehicle. The vehicle-mounted machine must be functionally capable of realizing information communication between people and car, car and the outside world (car and car).

In the present disclosure, the specific time when the execution of 101 to 103 is started may be determined according to the data transmission situation of the first carrier, such as example, a time when data needs to be transmitted on the first carrier, and a time when resources are reselected on the first carrier. Or the specific time may be determined, combining the data transmission situation of the first carrier and the data transmission situation of other carriers used by the terminal, such as a time when a data bearer is being transmitted on the first carrier, and a data transmission situation carried by carriers other than the first carrier changes, and the like, which is not particularly limited in this embodiment.

Optionally, in a possible implementation manner of this embodiment, in 101, the terminal may specifically determine whether the data transmission mode of the first carrier is a multi-carrier transmission mode, by determining whether the first carrier is used to carry one first transmission entity together with at least one second carrier.

Specifically, the terminal may specifically determine whether the first carrier is used to carry one first transmission entity together with at least one second carrier. If the first carrier is used to carry the one first transmission entity together with the at least one second carrier, the terminal may determine that the data transmission mode of the first carrier is a multi-carrier transmission mode.

In an embodiment, the first transmission entity may include, but is not limited to, a Radio Link Control (RLC) entity, and one RLC entity may correspond to one logical channel, and may also be any other transmission entity, which is not particularly limited in this embodiment.

In a specific implementation process, the one first transmission entity is using the at least one second carrier to transmit data. If the at least one second carrier is not currently used to carry the one first transmission entity, the first carrier is still the only one carrier carrying the transmission entity. Only in a case where the at least one second carrier is currently being used to carry the one first transmission entity, the data transmission mode of the first carrier can be determined as the multi-carrier transmission mode, and the reliability of data transmission can be effectively improved.

Specifically, the terminal may specifically determine whether the first carrier is used to carry one first transmission entity together with at least one second carrier that is currently being used. If the first carrier is used to carry the one first transmission entity together with the at least one second carrier that is currently being used, the terminal may determine that the data transmission mode of the first carrier is a multi-carrier transmission mode.

Optionally, in a possible implementation manner of this embodiment, in 101, the terminal may specifically determine whether the data transmission mode of the first carrier is a multi-carrier transmission mode, by determining whether at least one third carrier is currently being used in a first carrier set to which the first carrier belongs.

In an embodiment, the first carrier set may be a set of several carriers configured in advance using a preset configuration rule, and the relationship between each of the carriers in the set may be defined according to the configuration rule, which is not particularly limited in this embodiment.

Specifically, the terminal may specifically determine whether at least one third carrier in the first carrier set to which the first carrier belongs is currently being used. If the at least one third carrier in the first carrier set to which the first carrier belongs is currently being used, the terminal may determine that the data transmission mode of the first carrier is a multi-carrier transmission mode.

Optionally, in a possible implementation manner of this embodiment, in 101, the multi-carrier transmission mode may include, but is not limited to, a multi-carrier transmission mode based on data repetition. In the multi-carrier transmission mode based on data repetition, a data copy function of a transmission entity such as a Packet Data Convergence Protocol (PDCP) entity can be used to make the copied transmission data such as a PDCP layer protocol data unit Protocol Data Unit (PDU) is transmitted to next layer transmission entity, such as an RLC entity.

In a specific implementation process, the terminal may specifically determine whether the data transmission mode of the first carrier is a multi-carrier transmission mode based on data repetition by determining whether the first carrier is used to carry repeated data.

Specifically, the terminal may specifically determine whether the first carrier is used to carry repeated data. If the first carrier is used to carry the repeated data, the terminal may determine that the data transmission mode of the first carrier is a multi-carrier transmission mode based on data repetition.

In an embodiment, the repeated data may include, but is not limited to, a repeated protocol data unit (PDU) of PDCP layer, and may also be repeated physical layer PDU of any other entity layer, which is not particularly limited in this embodiment.

In another specific implementation process, the terminal may specifically determine whether the data transmission method of the first carrier is a multi-carrier transmission mode based on data repetition, by determining whether the first carrier is used to carry a second transmission entity that transmits repeated data.

Specifically, the terminal may specifically determine whether the first carrier is used to carry a second transmission entity that transmits repeated data. If the first carrier is used to carry a second transmission entity that transmits repeated data, the terminal may determine that the data transmission mode of the first carrier is a multi-carrier transmission mode based on data repetition.

It should be noted that the second transmission entity involved in the present disclosure is a transmission entity different from the first transmission entity.

In an embodiment, the repeated data may include, but is not limited to, a repeated protocol data units (PDU) of PDCP layer, and may also be repeated PDU of any other entity layer, which is not particularly limited in this embodiment.

Specifically, the repeated data may include, but is not limited to, repeated data of a first PDCP entity, and may also be repeated data of any other entity, which is not particularly limited in this embodiment. Data of a first PDCP entity is being transmitted by a third transmission entity, and the second transmission entity is used to transmit the repeated data of the first PDCP entity.

It should be noted that the third transmission entity involved in the present disclosure is a transmission entity different from the second transmission entity.

In an embodiment, the second transmission entity or the third transmission entity may include, but is not limited to, an RLC entity, and one RLC entity may correspond to one logical channel, and may be any other transmission entity, which is not particularly limited in this embodiment.

Optionally, in a possible implementation manner of this embodiment, in 102, the terminal may specifically obtain a carrier state parameter of the first carrier, and further, the terminal may obtain a multi-carrier transmission parameter according to the carrier state parameter.

In an embodiment, the carrier state parameter may include, but is not limited to, at least one of a Channel Busy Ratio (CBR), a Received Signal Strength Indicator (RSSI), a service type, and a priority, which is not particularly limited in this embodiment.

In a specific implementation process, before obtaining the multi-carrier transmission parameter according to the carrier state parameter, the terminal may further obtain a correspondence relationship between the carrier state parameter and the multi-carrier transmission parameter, so that the terminal obtains the multi-carrier transmission parameter of the first carrier according to the carrier state parameter.

For example, the terminal may specifically obtain a correspondence relationship between the carrier state parameter and the multi-carrier transmission parameter from a network device.

Specifically, the network device may be a network element such as an Evolved NodeB (eNB) in the LTE system, which is not particularly limited in this embodiment.

Specifically, the terminal may specifically receive configuration information transmitted by a network device through high layer signaling or a system broadcast message. For example, the high layer signaling may be a Radio Resource Control (RRC) message, and specifically, an Information Element (IE) in the RRC message may carry the correspondence relationship between the carrier state parameter and the multi-carrier transmission parameter. The RRC message may be an RRC message in the prior art, such as an RRC CONNECTION RECONFIGURATION, etc., which is not limited in this embodiment. By extending the IE of the existing RRC message, the correspondence relationship between the carrier state parameter and the multi-carrier transmission parameter is carried, or the RRC message may be different from the existing RRC message in the prior art. Or, for another example, the high layer signaling may be a Media Access Control (MAC) Control Element (CE) message, and specifically, a new MAC CE message may be added to carry the correspondence relationship between the carrier state parameter and the multi-carrier transmission parameter. Or, for another example, the existing Master Information Block (MIB) or System Information Block (SIB) in the system broadcast message may be specifically used to carry the correspondence relationship between the carrier state parameter and the multi-carrier transmission parameter. Or a new SIB may be added to carry a correspondence relationship between the carrier state parameter and the multi-carrier transmission parameter.

Or, for another example, the terminal may specifically obtain a correspondence relationship between the carrier state parameter and the multi-carrier transmission parameter from a user card of the terminal.

Specifically, the user card of the terminal may include, but is not limited to, a User Identity Module (UIM) card, a Universal Subscriber Identity Module (USIM) card, and a Subscriber Identity Module (SIM) card or a Personal Identity Module (PIM) card, which is not particularly limited in this embodiment.

Or, for another example, the terminal may specifically obtain a correspondence relationship between the carrier state parameter and the multi-carrier transmission parameter from the device information of the terminal itself.

It should be noted that, in the present disclosure, when acquiring the correspondence relationship between the carrier state parameter and the multi-carrier transmission parameter, the terminal may preferentially obtain it from a network device. If the correspondence relationship between the carrier state parameter and the multi-carrier transmission parameter is obtained from the network device, then the terminal does not need to obtain it from the user card of the terminal or the device information of the terminal itself; if the correspondence relationship between the carrier state parameter and the multi-carrier transmission parameter is not obtained from the network device, then, the terminal may obtain it from the user card of the terminal or the device information of the terminal itself.

It should be noted that the second carrier and the third carrier involved in the present disclosure are carriers different from the first carrier. The second carrier and the third carrier do not have a fixed relationship with each other, and may be a same carrier or different carriers, which is not particularly limited in this embodiment.

In this embodiment, by determining the data transmission mode of the first carrier, and further if the data transmission mode of the first carrier is a multi-carrier transmission mode, the multi-carrier transmission parameter of the first carrier can be obtained, so that the data transmission is performed on the first carrier by using the multi-carrier transmission parameter, thereby implementing data transmission in an IoV system.

It should be noted that, for the foregoing method embodiments, for simplicity of description, they are all described as a series of action combinations, but those skilled in the art should know that the present disclosure is not limited by the described action order. Because according to the present disclosure, certain steps may be performed in another order or simultaneously. Secondly, those skilled in the art should also know that the embodiments described in the specification are all preferred embodiments, and the actions and modules involved are not necessarily required by the present disclosure.

In the above embodiments, the description of each embodiment has its own emphasis. For a part that is not described in detail in one embodiment, reference may be made to related descriptions in other embodiments.

Figure 2:
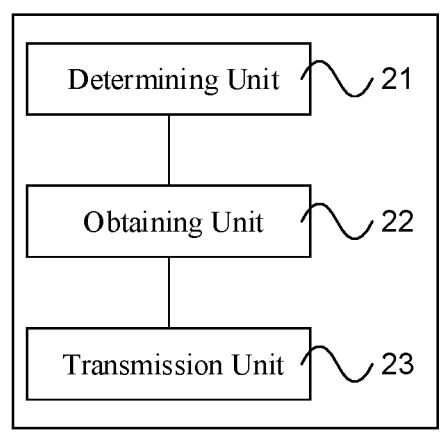
FIG. 2 is a schematic structural diagram of a terminal according to another embodiment of the present disclosure.

FIG. 2 is a schematic structural diagram of a terminal according to another embodiment of the present disclosure, as shown in FIG. 2. The network device in this embodiment may include a determining unit 21, an obtaining unit 22, and a transmission unit 23. The determining unit 21 is configured to determine a data transmission mode of a first carrier; and the obtaining unit 22 is configured to obtain a multi-carrier transmission parameter of the first carrier if the data transmission mode of the first carrier is the multi-carrier transmission mode; the transmission unit 23 is configured to transmit data on the first carrier by using the multi-carrier transmission parameter.

The so-called multi-carrier transmission parameter may include, but are not limited to, at least one of transmission power limit, coding and modulation mode limit, subchannel number limit, and physical resource block (PRB) number limit, which is not particularly limited in this embodiment.

The terminal involved in the present disclosure may be an in-vehicle terminal, or may also be a handheld terminal with a listening capability, which is not particularly limited in this embodiment.

Optionally, in a possible implementation manner of this embodiment, the determining unit 21 may be specifically configured to determine whether the first carrier is used to carry one first transmission entity together with other carriers; if the first carrier is used to carry the one first transmission entity together with other carriers, it is determined that the data transmission mode of the first carrier is the multi-carrier transmission mode.

In an embodiment, the first transmission entity may include, but is not limited to, an RLC entity, and one RLC entity may correspond to one logical channel, which is not particularly limited in this embodiment.

In a specific implementation process, the one first transmission entity is using the at least one second carrier to transmit data. If the at least one second carrier is not currently used to carry the one first transmission entity, the first carrier is still the only one carrier carrying the transmission entity. Only when the at least one second carrier is currently being used to carry the one first transmission entity, can the data transmission mode of the first carrier be determined as a multi-carrier transmission mode, and the reliability of data transmission can be effectively improved.

Optionally, in a possible implementation manner of this embodiment, the determining unit 21 may be specifically configured to determine whether at least one third carrier is currently being used in the first carrier set to which the first carrier belongs. If the at least one third carrier in the first carrier set to which the first carrier belongs is currently being used, the determining unit 21 determines that the data transmission mode of the first carrier is the multi-carrier transmission mode.

In an embodiment, the first carrier set may be a set of several carriers configured in advance using a preset configuration rule, and the relationship between each of the carriers in the set may be defined according to the configuration rule, which is not particularly limited in this embodiment.

Optionally, in a possible implementation manner of this embodiment, the multi-carrier transmission mode includes a multi-carrier transmission mode based on data repetition. In the multi-carrier transmission mode based on data repetition, a data copy function of a transmission entity such as a Packet Data Convergence Protocol (PDCP) entity can be used to make the copied transmission data such as a PDCP layer protocol data unit Protocol Data Unit (PDU) is transmitted to the next layer transmission entity, such as the RLC entity.

In a specific implementation process, the determining unit 21 may be specifically configured to determine whether the first carrier is used to carry repeated data; if the first carrier is used to carry repeated data, the determining unit 21 determines that the data transmission method is a multi-carrier transmission mode based on data repetition.

In an embodiment, the repeated data may include, but is not limited to, a repeated protocol data units (PDU) of PDCP layer, and may also be repeated PDU of any other entity layer, which is not particularly limited in this embodiment.

In another specific implementation process, the determining unit 21 may be specifically configured to determine whether the first carrier is used to carry a second transmission entity that transmits repeated data; if the first carrier is used to carry the second transmission entity that transmits repeated data, the determining unit 21 determines that the data transmission mode of the first carrier is a multi-carrier transmission mode based on data repetition.

It should be noted that the second transmission entity involved in the present disclosure is a transmission entity different from the first transmission entity.

In an embodiment, the repeated data may include, but is not limited to, a repeated protocol data units (PDU) of PDCP layer, and may also be repeated PDU of any other entity layer, which is not particularly limited in this embodiment. Specifically, the repeated data may include, but is not limited to, repeated data of a first PDCP entity, and may also be repeated data of any other entity, which is not particularly limited in this embodiment. Data of a first PDCP entity is being transmitted by a third transmission entity, and the second transmission entity is used to transmit the repeated data of the first PDCP entity.

It should be noted that the third transmission entity involved in the present disclosure is a transmission entity different from the second transmission entity.

In the second transmission entity, the second transmission entity or the third transmission entity may include, but is not limited to, an RLC entity, and one RLC entity may correspond to one logical channel, which is not particularly limited in this embodiment.

Optionally, in a possible implementation manner of this embodiment, the obtaining unit 22 may be specifically configured to obtain the carrier state parameter of the first carrier; and obtain the multi-carrier transmission parameter according to the carrier state parameter.

In an embodiment, the carrier state parameter may include, but is not limited to, at least one of a Channel Busy Ratio (CBR), a Received Signal Strength Indicator (RSSI), a service type, and a priority, which is not particularly limited in this embodiment.

In a specific implementation process, the obtaining unit 22 may be further configured to obtain the correspondence relationship between the carrier state parameter and the multi-carrier transmission parameter, so as to obtain the multi-carrier transmission parameter of the first carrier according to the carrier state parameter.

In a specific implementation process, the obtaining unit 22 may be specifically configured to obtain the correspondence relationship between the carrier state parameter and the multi-carrier transmission parameter from a network device.

In another specific implementation process, the obtaining unit 22 may be specifically configured to obtain the correspondence relationship between the carrier state parameter and the multi-carrier transmission parameter from a user card of the terminal. In another specific implementation process, the obtaining unit 22 may be specifically configured to obtain the correspondence relationship between the carrier state parameter and the multi-carrier transmission parameter from device information of the terminal.

It should be noted that the method in the embodiment corresponding to FIG. 1 may be implemented by the terminal provided in this embodiment. For detailed description, reference may be made to related content in the embodiment corresponding to FIG. 1, and details are not described herein again.

It should be noted that the second carrier and the third carrier involved in the present disclosure are carriers different from the first carrier. The second carrier and the third carrier do not have a fixed relationship with each other, and may be the same carrier or different carriers, which is not particularly limited in this embodiment.

In this embodiment, the determining unit determines the data transmission mode of the first carrier, and then the obtaining unit obtains the multi-carrier transmission parameters of the first carrier if the data transmission mode of the first carrier is the multi-carrier transmission mode, so that the transmission unit can use the multi-carrier transmission parameter to perform data transmission on the first carrier, thereby implementing data transmission in an IoV system.

Those skilled in the art can clearly understand that, for the convenience and brevity of description, the specific working processes of the systems, devices, and units described above can refer to the corresponding processes in the foregoing method embodiments, and are not repeated here.

In the several embodiments provided by the present disclosure, it should be understood that the disclosed systems, devices, and methods may be implemented in other ways. For example, the device embodiments described above are only schematic. For example, the division of the unit is only a logical function division. In actual implementation, there may be another division manner. For example, multiple units or components may be combined, or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, may be located in one place, or may be distributed on multiple network units. Some or all of the units may be selected according to actual needs to achieve the objective of the solution of this embodiment.

In addition, each functional unit in each embodiment of the present disclosure may be integrated into one processing unit, or each unit may exist separately physically, or two or more units may be integrated into one unit. The above integrated unit may be implemented in the form of hardware, or in the form of hardware plus software functional units. According to one embodiment, the software may be provided by a computer-readable storage medium having stored thereon computer instructions that, when executed by a processor, implement steps of the method according to any one of the above embodiments.

Finally, it should be noted that the above embodiments are only used to illustrate the technical solution of the present disclosure, rather than limiting them. Although the present disclosure has been described in detail with reference to the foregoing embodiments, those skilled in the art should understand that they can make modifications to the technical solutions described in the foregoing embodiments, or equivalent replacements of some of the technical features thereof; and these modifications or replacements do not depart from the spirit and scope of the technical solutions of the embodiments of the present disclosure.

What is claimed is:

1. A data transmission method performed by a terminal in an Internet of Vehicles (IoV) system, comprising:
    determining a data transmission mode of a first carrier;
    obtaining a multi-carrier transmission parameter of the first carrier, if the data transmission mode of the first carrier is a multi-carrier transmission mode; and
    performing data transmission on the first carrier by using the multi-carrier transmission parameter,
    wherein, the obtaining the multi-carrier transmission parameter of the first carrier comprises: obtaining a carrier state parameter of the first carrier; and obtaining the multi-carrier transmission parameter according to the carrier state parameter, and
    wherein, before obtaining the multi-carrier transmission parameter according to the carrier state parameter, the method further comprises: obtaining a correspondence relationship between the carrier state parameter and the multi-carrier transmission parameter;
    and obtaining the multi-carrier transmission parameter of the first carrier according to the carrier state parameter and the correspondence relationship.

2. The data transmission method according to claim 1, wherein, the multi-carrier transmission parameter comprises at least one of transmission power limit, coding and modulation mode limit, subchannel number limit, and physical resource block (PRB) number limit.

3. The data transmission method according to claim 1, wherein, the determining the data transmission mode of the first carrier comprises:
    determining whether the first carrier is used to carry one first transmission entity together with at least one second carrier; and
    determining that the data transmission mode of the first carrier is the multi-carrier transmission mode, if the first carrier is used to carry the one first transmission entity together with the at least one second carrier.

4. The data transmission method according to claim 3, wherein, the one first transmission entity is using the at least one second carrier to transmit data.

5. The data transmission method according to claim 1, wherein, the determining the data transmission mode of the first carrier comprises:
    determining whether at least one third carrier within a first carrier set to which the first carrier belongs is currently being used; and
    determining that the data transmission mode of the first carrier is the multi-carrier transmission mode, if the at least one third carrier in the first carrier set to which the first carrier belongs is currently being used.

6. The data transmission method according to claim 1, wherein, the multi-carrier transmission mode comprises a data repetition-based multi-carrier transmission mode.

7. The data transmission method according to claim 6, wherein, the determining the data transmission mode of the first carrier comprises:
    determining whether the first carrier is used to carry repeated data; and
    determining that the data transmission mode of the first carrier is the data repetition based multi-carrier transmission mode, if the first carrier is used to carry the repeated data.

8. The data transmission method according to claim 7, wherein, the repeated data comprises a repeated data unit of a Packet Data Convergence Protocol (PDCP) layer.

9. The data transmission method according to claim 6, wherein, the determining the data transmission mode of the first carrier comprises:
    determining whether the first carrier is used to carry a second transmission entity that transmits repeated data; and
    determining that the data transmission mode of the first carrier is the data repetition based multi-carrier transmission mode, if the first carrier is used to carry the second transmission entity that transmits the repeated data.

10. The data transmission method according to claim 9, wherein, the repeated data comprises a repeated data unit of a Packet Data Convergence Protocol (PDCP) layer.

11. The data transmission method according to claim 9, wherein, the repeated data comprises repeated data of a first Packet Data Convergence Protocol (PDCP) entity; data of the first PDCP entity is being transmitted by a third transmission entity, and the second transmission entity is used to transmit the repeated data of the first PDCP entity.

12. The data transmission method according to claim 9, wherein, the second transmission entity comprises a Radio Link Control (RLC) entity; the RLC entity corresponds to a logical channel.

13. The data transmission method according to claim 1, wherein, the carrier state parameter comprises at least one of a Channel Busy Ratio (CBR), a Received Signal Strength Indicator (RSSI), a service type, and a priority.

14. The data transmission method according to claim 1, wherein, the obtaining the correspondence relationship between the carrier state parameter and the multi-carrier transmission parameter comprises:
    obtaining the correspondence relationship between the carrier state parameter and the multi-carrier transmission parameter from a network device.

15. The data transmission method according to claim 1, wherein, the obtaining the correspondence relationship between the carrier state parameter and the multi-carrier transmission parameter comprises:
    obtaining the correspondence relationship between the carrier state parameter and the multi-carrier transmission parameter from a user card of the terminal.

16. The data transmission method according to claim 1, wherein, the obtaining the correspondence relationship between the carrier state parameter and the multi-carrier transmission parameter comprises:

obtaining the correspondence relationship between the carrier state parameter and the multi-carrier transmission parameter from device information of the terminal.

17. A terminal in an Internet of Vehicles (IoV) system, comprising:

a determining unit, configured to determine a data transmission mode of a first carrier;

an obtaining unit, configured to obtain a multi-carrier transmission parameter of the first carrier, if the data transmission mode of the first carrier is a multi-carrier transmission mode; and a transmission unit, configured to transmit data on the first carrier by using the multi-carrier transmission parameter, wherein, the obtaining unit is further configured to:

before obtaining the multi-carrier transmission parameter of the first carrier, obtain a carrier state parameter of the first carrier;

obtain a correspondence relationship between the carrier state parameter and the multi-carrier transmission parameter of the first carrier; and obtain the multi-carrier transmission parameter of the first carrier according to the carrier state parameter and the correspondence relationship.

18. A non-transitory computer-readable storage medium having stored thereon computer instructions that, when executed by a processor of a terminal in an Internet of Vehicles (IoV) system, cause the terminal to:

determine a data transmission mode of a first carrier;

obtain a multi-carrier transmission parameter of the first carrier, if the data transmission mode of the first carrier is a multi-carrier transmission mode; and perform data transmission on the first carrier by using the multi-carrier transmission parameter, wherein, obtaining the multi-carrier transmission parameter of the first carrier comprises: obtaining a carrier state parameter of the first carrier; and obtaining the multi-carrier transmission parameter according to the carrier state parameter, and wherein, before obtaining the multi-carrier transmission parameter according to the carrier state parameter, terminal is further caused to: obtain a correspondence relationship between the carrier state parameter and the multi-carrier transmission parameter; and obtain the multi-carrier transmission parameter of the first carrier according to the carrier state parameter and the correspondence relationship.

* * * * *